July 7, 1931. F. RITZMAN ET AL 1,812,900
CRATE
Filed Aug. 18, 1928     5 Sheets-Sheet 1

INVENTORS
F. Ritzman and
BY D. Ritzman
H. J. Sanders
ATTORNEY

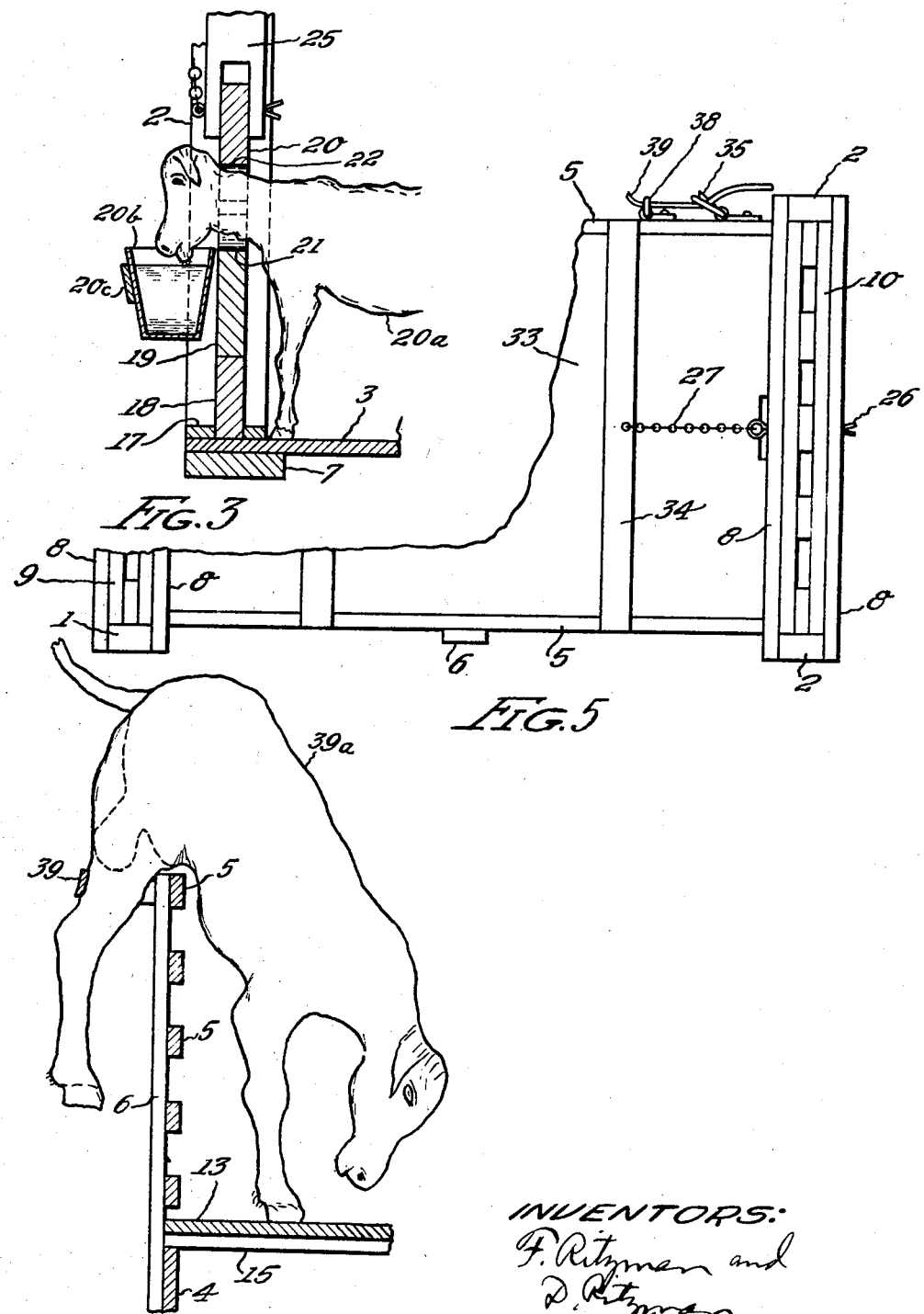

July 7, 1931.  F. RITZMAN ET AL  1,812,900
CRATE
Filed Aug. 18, 1928  5 Sheets-Sheet 4
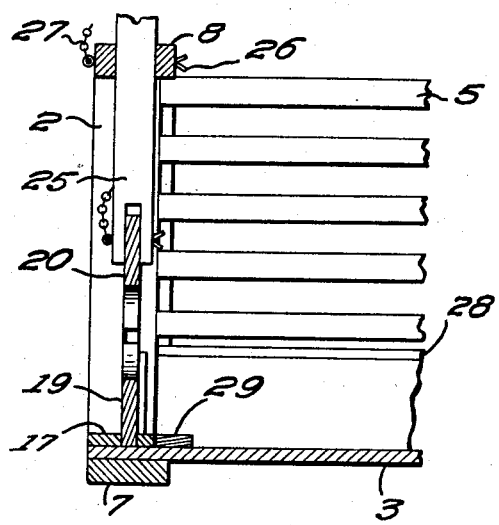
FIG. 15
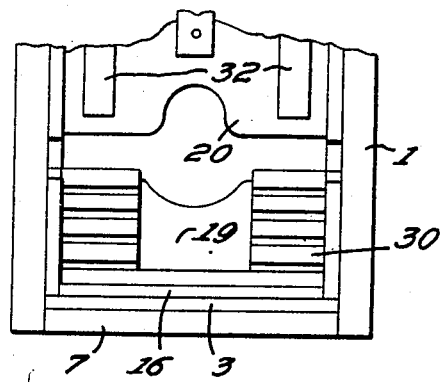
FIG. 16
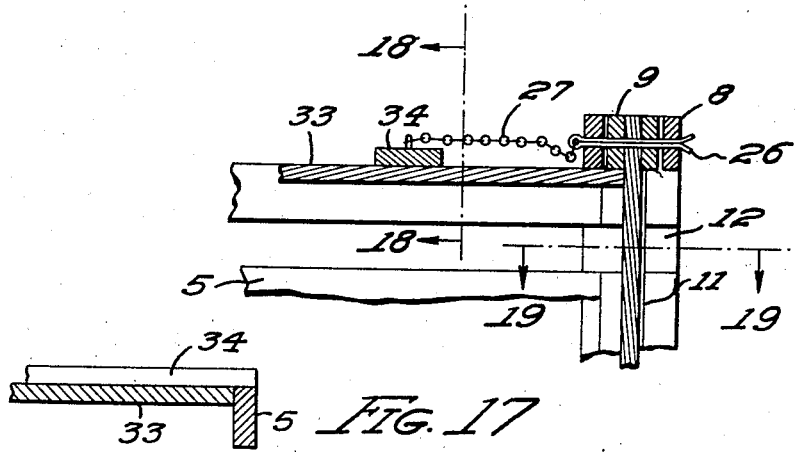
FIG. 17
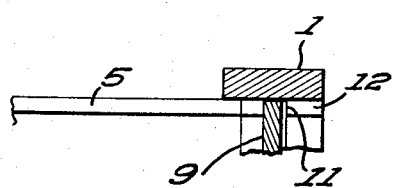
FIG. 18
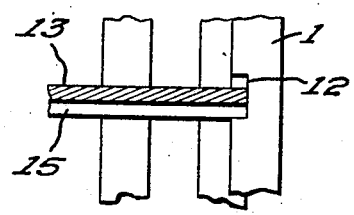
FIG. 9
FIG. 19
INVENTORS:
F. Ritzman and
D. Ritzman
BY H. J. Sanders
ATTORNEY July 7, 1931.  F. RITZMAN ET AL  1,812,900
CRATE
Filed Aug. 18, 1928  5 Sheets-Sheet 5

INVENTORS:
F. Ritzman and
D. Ritzman
BY H. J. Sanders
ATTORNEY

Patented July 7, 1931

1,812,900

UNITED STATES PATENT OFFICE

FRANK RITZMAN AND DONALD RITZMAN, OF CHICAGO, ILLINOIS

CRATE

Application filed August 18, 1928. Serial No. 300,463.

This invention relates to improvements in animal and poultry crates and its object is to provide a crate that is compact in assembly, of sturdy construction, durable and efficient in operation, inexpensive to manufacture and that is easily handled by one man for any of its purposes.

With the foregoing and other objects in view the invention consists in the combination and arrangement of parts to be hereinafter fully described, pointed out in the claims and illustrated in the accompanying drawings which form a part of this application for patent and in which—

Fig. 3 is a fragmentary view of the front end of the crate showing a calf therein, drinking from a pail.

Figure 7:
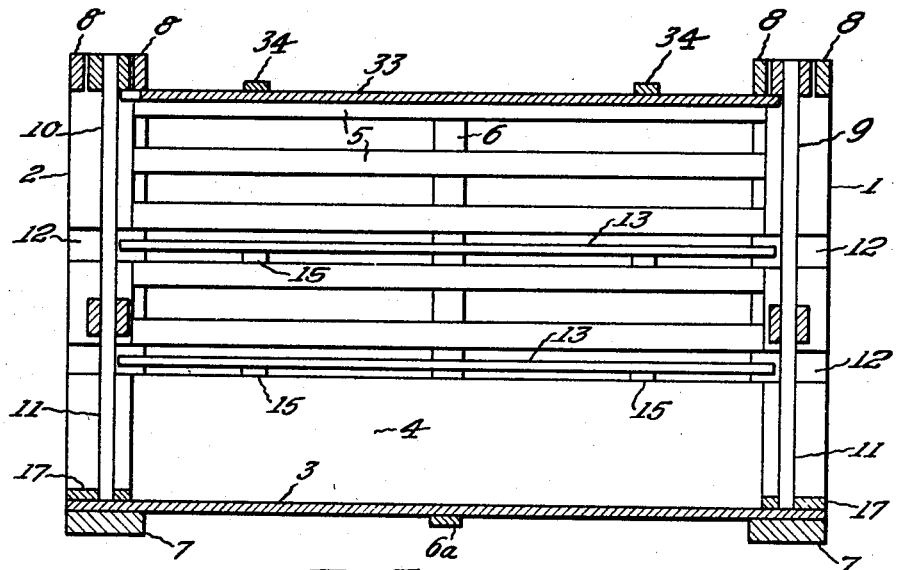
Figure 8:
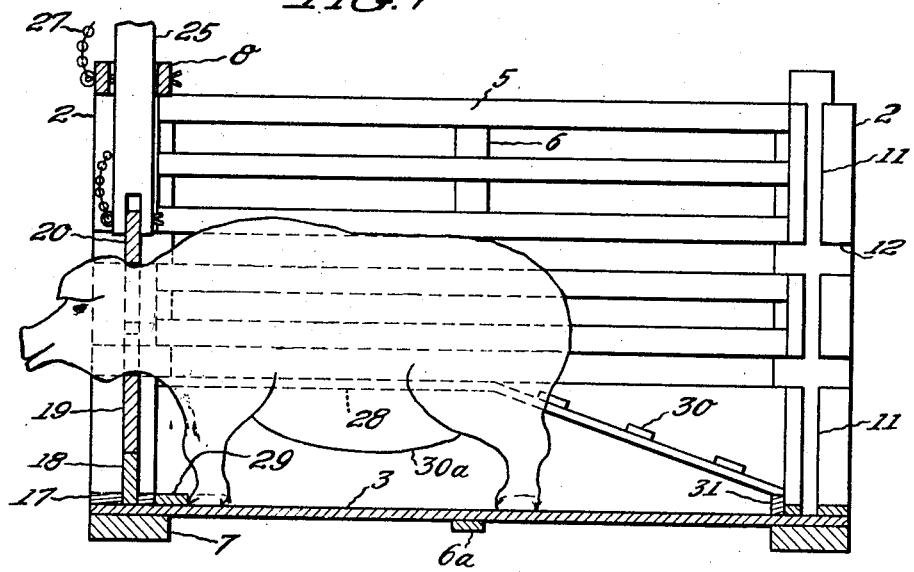

Fig. 5 is a fragmentary top plan view of the crate. Fig. 6 is a fragmentary view of one side of the crate showing an animal held in position for castration. Fig. 7 is a vertical longitudinal sectional view of the crate showing it ready to receive poultry or for like purpose. Fig. 8 is a fragmentary sectional view of the crate showing a sow retained therein in breeding position.

Fig. 9 is a fragmentary sectional view of the crate.

Figure 10:
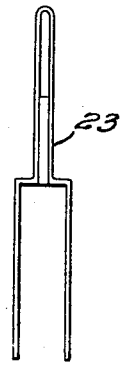

Fig. 10 is a view of a fork or standard to which a lever is secured.

Figures 1, 2:
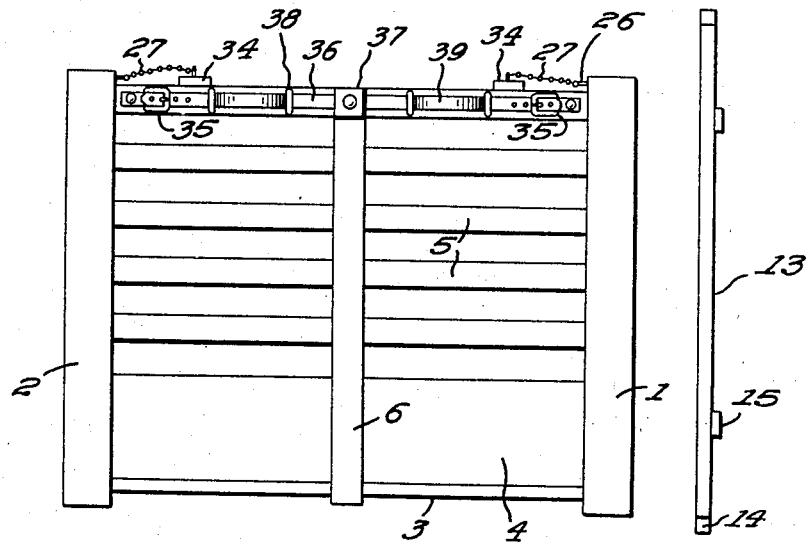
Fig. 1 is a view of the crate in side elevation.
Fig. 2 is an edge view of a partition employed.
Figure 11:
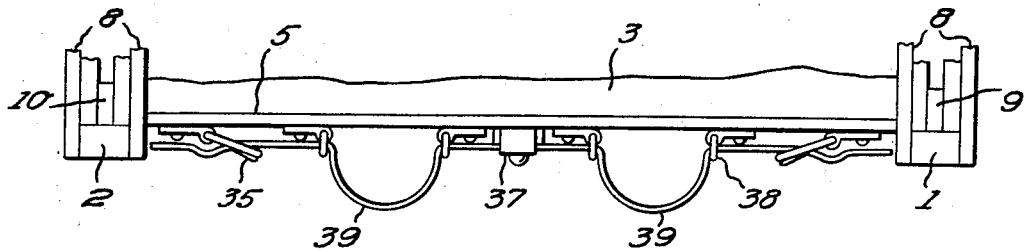

Fig. 11 is a fragmentary plan view of Fig. 1.

Figure 4:
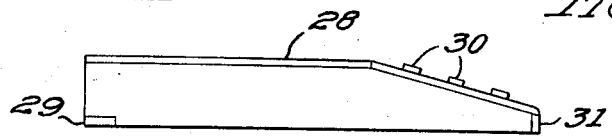
Fig. 4 is a view in side elevation of the breeding bed.
Figure 12:
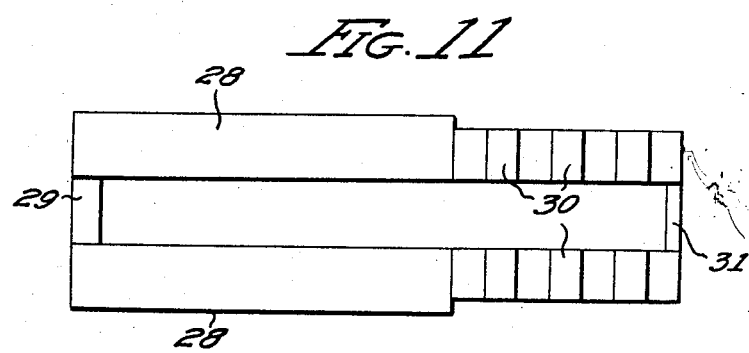

Fig. 12 is a top plan view of Fig. 4.

Figures 13, 14:
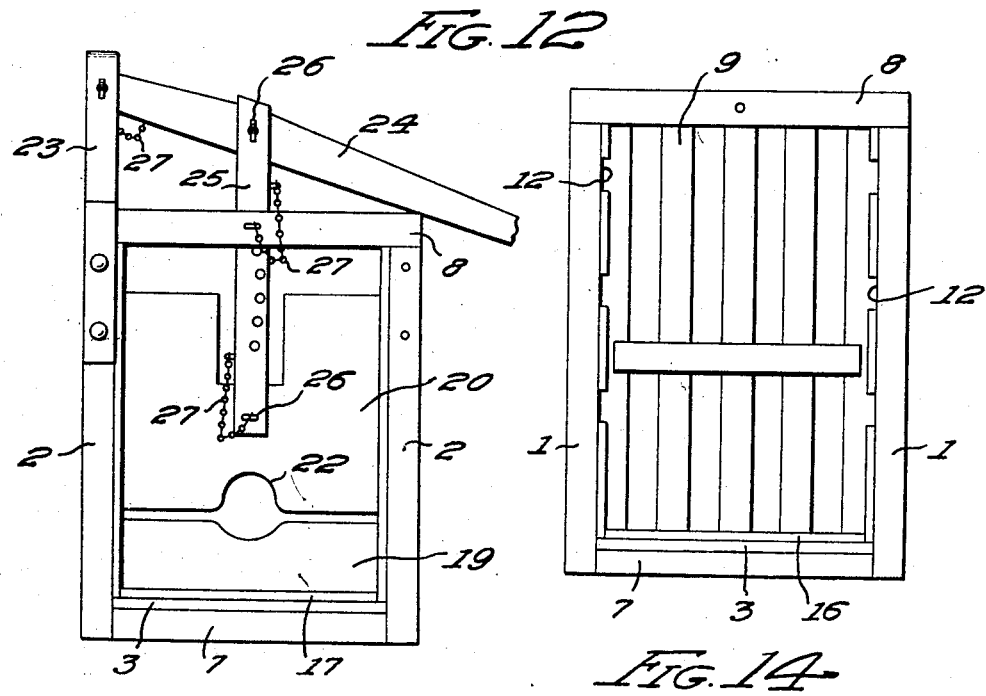

Figs. 13 and 14 are opposite end views of the crate.

Fig. 15 is an enlarged fragmentary sectional view of the crate.

Fig. 16 is a fragmentary end view in elevation, of the crate, showing the breeding bed in position and the head stock at one end of the crate partly open.

Fig. 17 is an enlarged vertical central sectional view of the crate.

Figs. 18 and 19 are sections taken respectively on the lines 18—18 and 19—19 of Fig. 17.

Like reference characters denote corresponding parts throughout the several views.

The present crate is capable of a variety of uses. It is designed as a poultry shipping crate in which capacity it is provided with a plurality of partitions; as a hog or calf crate, at which time the partitions are removed; as a hog, sheep or lamb stock to hold the animals singly while they are being marked, ringed or for other purpose, as a breeding house for hogs and in this capacity it is provided with a removable bed to support the body of the animal; and as a stock in which to hold the hind legs of an animal while being castrated.

The crate comprises a permanent floor or base, permanent side slats, removable end doors or gates, partitions and roof or top, a removable head stock, a permanent and adjustable leg stock and a removable breeding bed. The framework or body portion of the crate comprises the front corner posts 2, rear corner posts 1, the base or floor 3, the longitudinally extending side pieces 4 resting upon said base and connecting the front and rear corner posts, the slats 5, the central vertical side braces 6 that are connected by a cross brace 6a extending beneath the base, and end cross pieces 7 that connect the corner posts at each end of the crate and receive the ends of the base 3.

The front corner posts are recessed to receive the ends of the spaced transverse pieces 8, as are also the rear corner posts, each pair of cross pieces 8 together with its pair of corner posts forming a guide frame that receives an end gate 9 or 10, said gates being readily removable from the crate and in operative position running in the vertical recesses 11 in the corner posts, the recess 11 in the rear corner posts being intercepted by the relatively wide spaced transversely extending recesses 12, said recesses 12 being formed between the side slats 5 to receive the removable longitudinally extending partitions 13 each of which is formed at its four corners with the notches 14 and with the transverse cleats 15.

The partitions 13 are introduced from the rear end of the crate after the rear gate 9 is removed, the notches in said partitions riding against the vertically recessed inner corners of the front corner posts, the partitions being notched at all corners to make them reversible, that is, so that either end of the partition may be introduced first at the rear end of the crate.

Spaced cleats 16 connecting the rear corner posts lie upon the base 3 and form a sill, the space between said cleats receiving the lower end of the rear gate when in position, similar cleats 17 connecting the front corner posts and forming a front sill receive the lower end of the front end gate when it is in closed position.

Interchangeably received, with the front end gate, in the vertically recessed faces of the front corner posts are the riser 18 and the head stock members 19, 20, the member 19 being received upon said riser, said member 19 being formed along its top edge with an arcuate recess 21 adapted to cooperate with a like recess 22 in the member 20, as shown in Figs. 13 and 3. The riser 18 is not shown in Fig. 13 because it is employed only when the head stock is to be raised above its normal position, shown in Fig. 13, to receive the head of a calf 20a confined in the crate while feeding or for other purpose. It is frequently difficult to wean a calf and teach him to drink from a pail or the like but by securing a pail 20b of milk, by a nail or support 20c, to the member 19 of the head stock outside the crate while the calf is held therein he will finally discover the purpose of the milk pail and learn to drink of its contents and at the same time he is prevented from overturning the pail etc.

Interchangeably secured to either of the front corner posts is a fork 23 that serves as a fulcrum for the operating lever 24 that is connected to the lift bar 25 that engages the head stock member 20 to raise and lower the same to free or detain, in cooperation with the member 19, the head of the animal.

The lever 24, fork 23, bar 25 and member 20 are connected together by pins 26 at the end of chains 27, said lift bar 25 being releasably locked, together with the member 20, in adjusted position to the crate, in like manner, so that the members 19, 20 may be adjusted relatively as desired.

A breeding bed for hogs comprising two spaced elevated platforms 28 connected by a cross piece 29 and having one end of each sloping downwardly and provided with spaced cleats or steps 30 and connected at their lower ends by a piece 31 is adapted for removable disposal within the crate, the high end of the bed being introduced first through the rear end of the crate, the platforms being formed with laterally extending flanges that ride in the lowest pair of transverse recesses 12 and then over the top edges of the side pieces 4, the bed when completely disposed inside the crate extending from its rear sill 16 to its front sill 17, the front end of the bed being immediately adjacent the opening in the head stock as shown in Fig. 16. A sow 30a is now induced to enter the crate over the steps 30 of the bed until she reaches the far end thereof. With the head stock open her head is placed therein and the stock closed. The body of the animal will rest upon the two platforms 28 and she is in a breeding position. The member 20 of the head stock is provided with cleats 32 which are disposed inside the crate when the stock is in assembled position.

The crate is provided with a top 33 which is of a width to fit snugly between the topmost slats of the crate sides, said top being provided with the transverse cleats 34. The top is applied to the crate by depressing it until the ends of the cleats, which extend beyond the sides of the top, ride upon the topmost slats. The length of the top is such that its ends will ride beneath one cross piece 8 at its front and one at the rear of the crate when the top is in closed position, a chain and pin 27, 26 carried by each cleat 34 being adapted to secure the top to perforated portions of the cross pieces 8 and to the tops of the end gates thus securely locking all of said members in assembled position.

At each end of a topmost slat 5 at one side of the crate is a buckle 35, said buckles receiving the ends of the strap 36 that is secured by clamp 37 to the side brace 6, said strap passing through the guide rings 38, spaced apart, and pivotally secured to the topmost slat 5, said strap forming loops or bulged portions 39, spaced apart, to receive the hind legs of an animal such as a hog or sheep, 39a, his front legs resting upon one of the partitions 13 which has been inserted in the crate, or on the crate floor, the top 33 of the crate having been previously removed. The strap 36 is now tightened upon the legs of the animal to hold it secure when it may be castrated, the operation being performed without danger of injury to the animal and with the least difficulty to the surgeon or operator. When the crate is used to ship hogs, pigs, sheep or like animals the partitions are removed and the top secured in position with the end gates in closed position. The animal is then securely caged or crated without cramping it or depriving it of air or subjecting it to inconvenience of any kind. In shipping poultry the partitions are inserted to form tiers for two or more "stories" of fowl.

What is claimed is:—

1. In a crate, a body portion, end gates removably carried thereby, and a breeding bed removably carried by said body portion, said breeding bed comprising spaced connected platforms slidably engaging with the sides of the body portion, said platforms having one inclined stepped end each.

2. In a crate, a body portion having side slats, end gates removably carried by said body portion, and a breeding bed removably carried by said body portion, said bed comprising spaced connected flanged platforms, the flanges thereof riding over the edges of said slats, said platforms each having one inclined end provided with steps.

3. In a crate, a body portion, end gates removably carried thereby, and a breeding bed provided with spaced platforms removably carried by said body portion, said breeding bed having an inclined portion provided with steps.

In testimony that we claim the foregoing as our own we have hereto affixed our signatures.

FRANK RITZMAN.
DONALD RITZMAN.